United States Patent
Medana

(10) Patent No.: US 6,893,125 B2
(45) Date of Patent: May 17, 2005

(54) SIMPLIFIED HINGING DEVICE AND TEMPLE BAR THEREBY OBTAINED, PARTICULARLY FOR EYEGLASS FRAMES

(75) Inventor: Guido Medana, Valdobbiadene (IT)

(73) Assignee: Foval Srl, Valdobbiadene (IT)

(*) Notice: Subject to any disclaimer, the term of this patent is extended or adjusted under 35 U.S.C. 154(b) by 0 days.

(21) Appl. No.: 10/624,215

(22) Filed: Jul. 22, 2003

(65) Prior Publication Data

US 2004/0119938 A1 Jun. 24, 2004

(30) Foreign Application Priority Data

Jul. 22, 2002 (IT) .................................... TV2002A0085

(51) Int. Cl.[7] .............................................. G02C 5/14
(52) U.S. Cl. ...................... 351/119; 351/111; 351/153
(58) Field of Search ................................. 351/153, 110, 351/113, 111, 41, 121, 119, 118; 16/228

(56) References Cited

U.S. PATENT DOCUMENTS 5,781,270 A * 7/1998 Fortini ........................ 351/110

* cited by examiner

Primary Examiner—Hung Xuan Dang
(74) Attorney, Agent, or Firm—Harrison & Egbert

(57) ABSTRACT

A simplified hinging device and a temple bar thereby obtained, particularly for eyeglass frames, includes a prevalently metallic termination, which is widened, contoured, holed and bent according to a U shape, which engages, by means of a pivoting screw or one or more projections, another prevalently metallic termination, which is widened, contoured and holed, free to rotate about the axis of the aforesaid screw, pivot point or projection.

2 Claims, 2 Drawing Sheets

SIMPLIFIED HINGING DEVICE AND TEMPLE BAR THEREBY OBTAINED, PARTICULARLY FOR EYEGLASS FRAMES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a simplified hinging device and temple bar thereby obtained, particularly for eyeglass frames.

The innovation finds particular though not exclusive application in the eyeglass industry.

BACKGROUND OF THE INVENTION

Currently, various systems are known for hinging the temple bars of an eyeglass frame, with the respective lens-holder. This function, achieved on both sides of the eyeglass, has the main advantage of allowing closing the aforesaid temple bars, once the eyeglasses are removed from the user's face, thereby reducing their size and facilitating their insertion in the appropriate case.

Another requirement which must be met by eyeglass hinging devices is given by the fact that the temple bars, once spread, must open until they are parallel to each other, thereby providing the frame with sufficient stability on the face of the possible user.

Since, starting from the last twenty years of the past century, eyeglasses have massively entered the world of fashion, the entire industry linked thereto has had to adapt to the sudden style changes decided, from time to time, by fashion. For quite some time, a trend (apparently far from being abandoned) has been the fashion of so-called minimalism.

Eyeglasses thus exhibit simple, linear and very light shapes.

Traditional materials, heretofore used in the eyeglass industry, have gradually been abandoned, with preferences finally being given to solutions adopting around stainless steel or titanium wire, with diameters of the order of one millimeter!

With these dimensions, there has also been a radical transformation in regard to frame/lens holder hinging systems; such solutions have in fact led to the miniaturization of eyeglass hinges, but with dimensions still exceeding one millimeter.

It should also be specified that by so doing the need has been created to join said hinges with the temple bar and with the lens holder, with mechanical and/or welding systems, thereby burdening the final aesthetic result.

An object of the present invention is also to overcome the aforementioned drawbacks.

BRIEF SUMMARY OF THE INVENTION

This and other objects are achieved by the present invention, according to the characteristics set out in the accompanying claims, solving the problems described above by means of a simplified hinging device and a temple bar thereby obtained, particularly for eyeglass frames, comprising a prevalently metallic termination, which is widened, contoured, holed and bent according to a U shape, which engages, by means of a pivoting screw or one or more projections, another prevalently metallic termination, which is widened, contoured and holed, free to rotate about the axis of the aforesaid screw, pivot point or projection (for the sake of simplicity, only the screw embodiment shall be described herein).

In this way, thanks to the considerable creative contribution whose effect constitutes an immediate technical advancement, several advantages are obtained.

First of all, a considerable miniaturization of the hinging device is achieved, to the advantage of linearity and stylistic "cleanliness", perfectly suiting the current minimalist trend of the eyeglass industry.

A second aim is to obtain the hinging device directly from the same metal wire used to build the frame, without the aid of external components, mechanical attachments or welds; the latter is the source of frequent failure due to structural changes to the material employed, given the considerable temperatures used to obtain a good result.

A third aim is to simplify the production processes and hence inventory management, given the extremely small number of components present.

A fourth aim is consequently operating economy, with considerable cost reduction, to the advantage of the final users.

Another aim is due to the fact that widened terminations contribute to overall flexibility, assuring greater comfort and more safety in case of accidental impacts.

This and other advantages shall become readily apparent from the detailed description that follows of a preferential embodiment with the help of the accompanying schematic drawings, whose details of construction should not be construed as limiting but merely exemplifying.

BRIEF DESCRIPTION OF THE VIEW OF THE DRAWING

DETAILED DESCRIPTION OF THE INVENTION

Figure 1:
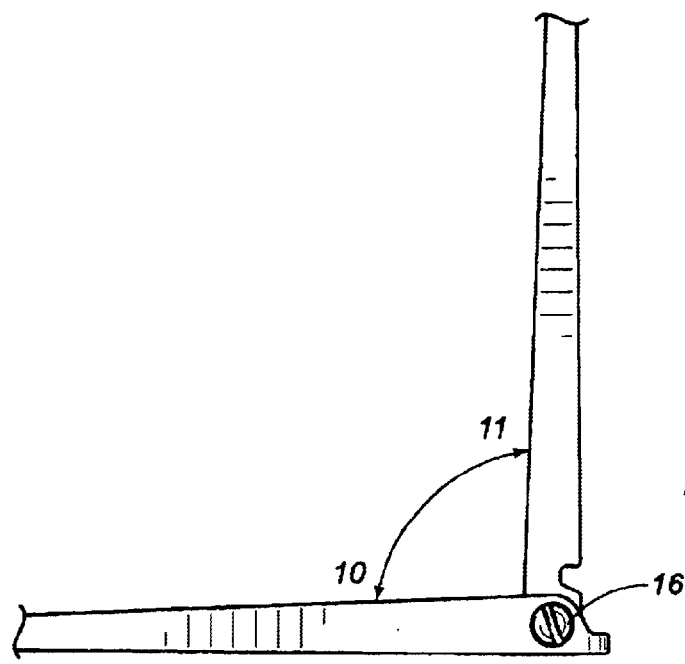
FIG. 1 is a top view of the assembly in a closed condition.

Taking as reference the figures of the accompanying tables, it is noted that the simplified hinging device and temple bar thereby obtained, particularly for eyeglass frames, is given by the termination 1, which, with the aid of a screw, is attached to the other termination 2.

The termination 1 is preferably made of metallic material, widened at an end and so shaped as to obtain a throat 3 and two holes 4 and 5.

Subsequently, it is bent according to a U curvature as in point 6, thereby obtaining the coaxial condition of the holes 4 and 5 and hence a female type of hinge.

The termination 2 is preferably made of metallic material, widened at an end and so shaped as to obtain a throat 7 and a hole 8.

Now, supposing that the termination 2 is inserted at the point 9, in the points 12 and 13 of the termination 1 and assembling the entire set with the screw 16, a hinging device will have been obtained.

Termination 2, for instance, will be free to rotate about screw 16, with an angular displacement given by the directions 10 and 11.

Figure 2:
FIG. 2 is a top view of the assembly in a condition of maximum opening.
Figure 3:
FIG. 3 is a side view of the assembly in an opened condition.
Figure 4:
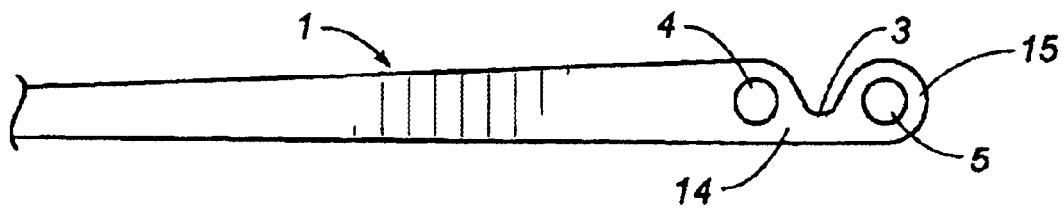
FIG. 4 is a top view of a termination with widening, contouring and holing.
Figure 5:
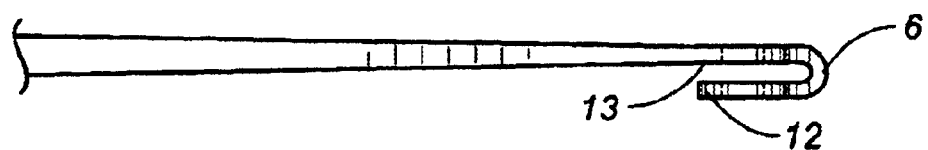
FIG. 5 is the side view of the same termination after bending into a U shape (finished piece).
Figure 6:
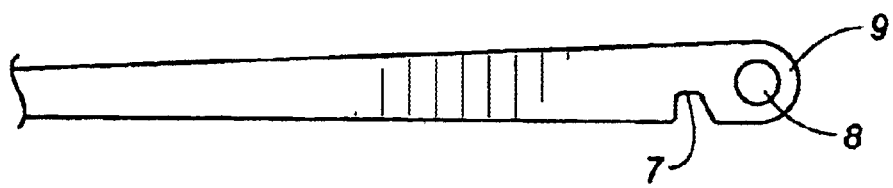
FIG. 6 is the top view of the second termination with widening, contouring and holding as a finished piece.
Figure 7:
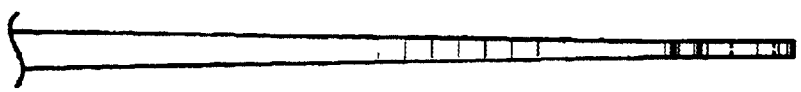
FIG. 7 is the side view of the same termination.

Specifically, the termination 2, rotating along the direction 11, will be placed in the condition of FIG. 2, obviously until the throat 7, of the termination 2, interferes with the projection 6 of the termination 1, i.e. in the point 17, thereby blocking the angular displacement of the termination 2.

Vice versa, said termination will be free to rotate towards the direction 10, until touching the termination 1 (it is recalled in any case that, from the condition of FIG. 2, the rotation of the termination 2 must be only by 90 degrees counter-clockwise).

I claim:

1. A temple bar for eyeglass frames comprising:

a first longitudinal member having a first hole and a second hole adjacent one end thereof, said first longitudinal member having a throat section of a width that is less than a width of said first longitudinal member, said throat section positioned between said first and second holes at said one end, said one end being bent such that said first and second holes are in axial alignment and in spaced relation;

a second longitudinal member having a hole adjacent one end thereof, said hole of said second longitudinal member being axially aligned with and positioned between said first and second holes of said first longitudinal member, said second longitudinal having a throat section formed at a side of said first hole opposite said one end of said longitudinal member; and a screw affixed to and extending through said first and second holes of said first longitudinal member and said hole of said second longitudinal member, said second longitudinal member being pivotable between a first position in side-by-side alignment with said first longitudinal member and a second position extending outwardly of said one end of said first longitudinal member in longitudinal alignment therewith, said throat section of said second longitudinal member overlying said throat section of said first longitudinal member when in said second position, said one end of said first longitudinal member having a generally U-shape.

2. The temple bar of claim 1, said first and second longitudinal members being of a metallic material.

* * * * *